United States Patent
Rai

(10) Patent No.: US 9,423,989 B2
(45) Date of Patent: Aug. 23, 2016

(54) SYSTEM AND METHOD FOR DYNAMICALLY RECONFIGURING ONE OR MORE AUTONOMOUS CELLS IN A PRINT SHOP ENVIRONMENT

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 2739 days.

(21) Appl. No.: 11/258,810

(22) Filed: Oct. 26, 2005

(65) Prior Publication Data

US 2007/0091355 A1    Apr. 26, 2007

(51) Int. Cl.
*G06F 3/12* (2006.01)
*G06Q 10/06* (2012.01)

(52) U.S. Cl.
CPC .............. *G06F 3/122* (2013.01); *G06F 3/1204* (2013.01); *G06F 3/126* (2013.01); *G06F 3/1219* (2013.01); *G06F 3/1259* (2013.01); *G06F 3/1275* (2013.01); *G06F 3/1282* (2013.01); *G06Q 10/06* (2013.01)

(58) Field of Classification Search
USPC ............................................................ 705/7
See application file for complete search history.

(56) References Cited

U.S. PATENT DOCUMENTS

| | | | |
|---|---|---|---|
| 4,631,930 A * | 12/1986 | Gutschmit et al. ............... 66/1 R |
| 5,946,661 A * | 8/1999 | Rothschild et al. ........... 705/7.25 |
| 6,573,910 B1 | 6/2003 | Duke et al. |
| 6,633,790 B2 | 10/2003 | Gartstein |
| 6,728,947 B1 * | 4/2004 | Bengston ...................... 717/103 |
| 6,805,502 B2 | 10/2004 | Rai et al. |
| 7,051,328 B2 * | 5/2006 | Rai et al. ........................ 718/102 |
| 7,791,741 B2 * | 9/2010 | Hindi ..................... G03G 15/50 358/1.1 |
| 2002/0072893 A1 * | 6/2002 | Wilson ............................. 703/26 |
| 2002/0078012 A1 | 6/2002 | Ryan et al. |
| 2002/0129081 A1 * | 9/2002 | Rai et al. ........................ 709/102 |
| 2003/0149747 A1 | 8/2003 | Rai et al. |
| 2004/0085561 A1 * | 5/2004 | Fromherz .................... 358/1.13 |
| 2004/0145774 A1 * | 7/2004 | Sesek et al. .................. 358/1.15 |
| 2004/0187113 A1 | 9/2004 | Viassolo |
| 2004/0225391 A1 * | 11/2004 | Fromherz et al. ............... 700/97 |
| 2005/0065830 A1 | 3/2005 | Duke et al. |

* cited by examiner

*Primary Examiner* — Thomas L Mansfield, Jr.
(74) *Attorney, Agent, or Firm* — Fay Sharpe LLP

(57) ABSTRACT

A method and system for processing jobs in a print shop is provided. The print shop includes at least two autonomous cells, and each autonomous cell includes a resource for performing an operation relative to at least one of the jobs. In one approach, the number of jobs requiring an operation at each one of the two autonomous cells is monitored. When the number of jobs requiring at least one operation at each one of the two autonomous cells exceeds a selected number, a reconfiguration mode is simulated for at least one of the two autonomous cells to obtain a reconfiguration desirability value. The at least one of the two autonomous cells is reconfigured when the reconfiguration desirability value differs from a selected reference value.

19 Claims, 6 Drawing Sheets

SYSTEM AND METHOD FOR DYNAMICALLY RECONFIGURING ONE OR MORE AUTONOMOUS CELLS IN A PRINT SHOP ENVIRONMENT

RELATED APPLICATIONS

The following applications are cited for the purpose of cross-reference and not for the purpose of claiming any priority therein.

Production Server for Automated Control of Production Document Management (Squires et al., U.S. Pat. No. 7,065,567, issued Jun. 20, 2006);

Print Shop Resource Optimization Via the Use of Autonomous Cells (Rai et al., U.S. Pat. No. 7,079,266, issued Jul. 18, 2006);

Methods and Systems for Determining Resource Capabilities for a Lean Production Environment, (Gartstein et al., U.S. Pat. No. 7,379,206, issued May 27, 2008);

Systems and Methods for Capturing Workflow Information (Rai et al., U.S. Pat. No. 7,242,302, issued Jul. 10, 2007);

Systems and Methods for Determining Process Cycle Efficiency in Production Environments (Rai, U.S. Patent Publication No. 2006/0224440, published Oct. 5, 2006);

Print Job Allocation System and Method (Rai et al., U.S. Pat. No. 7,626,717, issued Dec. 1, 2009);

System and Method of Evaluating Print Shop Consolidation Options in an Enterprise (Rai et al., U.S. Pat. No. 8,310,700, issued Nov. 13, 2012);

Planning Print Production (Rai, et al., U.S. Patent Publication No. 2007/0070379, published Mar. 29, 2007).

BACKGROUND

The present embodiments relate to a method and system for processing jobs in a print shop where a simulated reconfiguration is performed for at least one autonomous cell in a group of autonomous cells when it is determined that the group of autonomous cells is operating below a desired efficiency level. When the results of the simulation dictate, reconfiguration of at least one autonomous cell occurs. While the present embodiments find particular application in the context of print shop operation, they may also be amenable to other production related applications.

The costs for operating a print shop are generally categorized as the capitalization cost of the printing equipment, and the operating and employment costs for running the equipment. As print shops tend to transform from being lithographic to digital, additional equipment costs will be incurred, so that how the facilities of the print shops are managed becomes even more important to achieve the desired and more profitable operating results.

Print shops face regular pressures to reduce the costs and improve the productivity of their printing processes. This pressure exists whether a print shop is classified as a job print shop, e.g., one producing small-run individual print jobs for customers, a transactional print shop, e.g., one producing statements for a brokerage firm, or a production print shop, e.g., one producing large-run catalogs for mail order businesses. No matter which class a print shop falls into, each print shop operates in essentially the same way. It accepts a digital file, flat sheet stack, bound material or other original as a job input, operates upon this job according to customer instructions, e.g., paper selection, binding, and distribution, and produces a final product which is then transferred and billed to the customer.

The traditional print shop operation is separated into departments, such as data processing and e-prep, printing, finishing, and shipping departments. Each job progresses sequentially through the various departments. Operators are usually trained to operate one piece of equipment. Like pieces of equipment are usually grouped together within each department, and one operator per machine is required for each shift. This configuration produces frequent waste and requires large amounts of inter-shop inventory, which must then be moved from department to department as a job progresses through the print shop. This traditional method of print shop operation causes frequent delays in meeting job delivery dates, increases waste, and takes up a maximum amount of floor space. As a print shop ramps up its production, accurate job production time becomes increasingly difficult to estimate, often resulting in frequent overflow which must be outsourced to other print shops.

The scheduling and flow of jobs through print shops today is typically controlled by preset, often manual, scheduling policies and workflows that take into consideration only the overall equipment, physical layout and labor in the shop. Workflow is typically fixed in a departmental framework. Emphasis is given to keeping all the equipment busy, with the consequence that a lot of work in progress is generated, jobs are often late, error rates are large, and the exact status of specific jobs in progress in the shop is generally not known. Therefore, the productivity of the vast majority of print shops is far from the optimal that can be realized using modern control theory methods to adjust the scheduling, labor, and workflow to respond to both changes in the incoming job flow and to the state of the shop when the jobs are arriving.

Methods exist for improving the operation of the traditional print shop. One method involves re-conceptualizing a traditional print shop as a type of factory process. The print shop itself is then synonymous with the factory plant, and the print job with the manufactured product. Once thus re-conceptualized, commonly known factory flow processes, such as those discussed by Wallace J. Hopp and Mark L. Spearman in *Factory Physics* (McGraw Hill: New York, 1996) may be adapted to the print shop environment and used to improve the flow of print jobs through the print shop.

In accordance with another method, a print shop may be reorganized into autonomous cells as disclosed in co-pending application Ser. No. 09/706,430, Sudhendu Rai, et al. For each autonomous cell in a corresponding group, resources (e.g., equipment) are grouped together according to different job classes commonly encountered by a specific print shop. The jobs are then broken down into smaller sub-jobs and processed through the cells. Another method to improve operation is to cross-train operators on multiple pieces of equipment. Operators can then be allocated more flexibly as needed throughout the shop. Opportunities also exist to improve scheduling of jobs so as to reduce the amount of inventory and to more fully utilize equipment. An additional option is to improve the layout of equipment on the print shop floor in order to decrease the amount of excess movement required within the print shop. When implemented, these methods have been shown to reduce costs of all classes of print shops by up to twenty percent within six months of implementing the methods.

Although these methods for operational improvement exist, print shop owners are understandably slow to change their traditional methods of operations. One reason for hesitation is that change is typically quite invasive, requiring re-training operators, moving heavy equipment, and learning new habits, all of which equates to down time and lost productivity for the shop during transition. This lost productivity is problematic for a shop owner who must keep the shop operating smoothly throughout transition periods. There is thus little incentive for a print shop owner to make operational changes without having quantitative data showing a positive benefit to bottom-line profits. It is therefore problematic that print shop owners typically have insufficient data to quantify the extent of possible gains available to them by implementing improved operational methods.

Referring to FIGS. 3 and 4, and the accompanying text, of pending application Ser. No. 09/706,430, a print shop is configured for a given job mix by grouping resources into autonomous cells and then determining, with a simulation, whether the cells are suitably arranged. This configuration uses intercellular flow to gage when the autonomous cell arrangement is ready to be fixed in place. Inherent in developing the configuration are certain assumptions regarding job mix. That is, with proper correspondence of autonomous cells to job mix intercellular flow should be minimized. When such correspondence exists, each job, across a significant number of jobs, will be processed within a corresponding autonomous cell so that benefits from small-batch production with associated fast turnaround times (TAT), better quality control, less management overhead and lower work in progress (WIP), can be achieved.

The above approach to configuring the autonomous cells, teaching that cell arrangement is to be fixed upon print shop set-up, can be quite effective as long as job mix remains stable. As job mix changes, however, intercellular flow, among other parameters, can readily exceed an acceptable level. With this increase in intercellular flow, the above-mentioned benefits will inevitably be lost. While a need exists for dynamically reconfiguring the autonomous cells as job mix changes, an ad hoc shuffling of resources (e.g., equipment, software and labor) among autonomous cells can be time consuming and expensive. Moreover, without a rigorous approach for determining the outcome of such shuffling prior to actually doing it, there is no assurance that intercellular flow will even decrease markedly. Hence, it would be desirable to provide a non-intrusive approach for adequately gagging the effect of dynamically reconfiguring a group of autonomous cells prior to actually altering the resource mix among the autonomous cells.

SUMMARY

In accordance with one aspect of the disclosed embodiments, a system is disclosed for processing jobs in a print shop. The print shop includes two autonomous cells, wherein each autonomous cell includes a resource for performing an operation relative to at least one of the jobs. The job processing system includes: (a) a subsystem for monitoring the number of jobs requiring an operation at each one of the two autonomous cells, and (b) a controller, said controller including a simulation program, said controller using the simulation program to simulate a reconfiguration mode for at least one of the two autonomous cells to obtain a reconfiguration desirability value when the number of jobs requiring at least one operation at each one of the two autonomous cells exceeds a selected number. When the desirability value differs from a selected reference value, the at least one of the two autonomous cells is reconfigured.

In accordance with another aspect of the disclosed embodiments, a method is disclosed for processing jobs in a print shop. The print shop includes two autonomous cells, wherein each autonomous cell includes a resource for performing an operation relative to at least one of the jobs. The job processing method includes: (a) monitoring the number of jobs requiring an operation at each one of the two autonomous cells; (b) simulating a reconfiguration mode for at least one of the two autonomous cells to obtain a reconfiguration desirability value when the number of jobs requiring at least one operation at each one of the two autonomous cells exceeds a selected number; and (c) reconfiguring the at least one of the two autonomous cells when the reconfiguration desirability value differs from a selected reference value.

In accordance with yet another aspect of the disclosed embodiments, a method is disclosed for processing jobs in a print shop. The print shop includes a group of autonomous cells. The group of autonomous cells operates collectively a desired efficiency level, and each autonomous cell includes a resource for performing an operation relative to at least one of the jobs. The method includes: (a) determining whether the group of autonomous cells is collectively operating at the desired efficiency level; (b) simulating a reconfiguration mode for at least one of the group of autonomous cells to obtain a reconfiguration desirability value when the collective operation of the group of autonomous cells deviates from the desired efficiency level by a selected amount; and (c) reconfiguring at least one of the group of autonomous cells when the reconfiguration desirability value differs from a selected reference value.

DETAILED DESCRIPTION

Print shops are typically organized into departmental units (all printers together, all binders together, etc.) and print jobs are processed through the departments in sequential steps. Simple algorithms are used to schedule the jobs moving through the shop, e.g., first in first out, smaller jobs first, higher priority jobs first, etc. The flow of jobs can be improved by organizing the print shop into autonomous cells and breaking up large jobs into smaller batches.

Print shops collect widely varying amounts and types of data on their equipment, jobs and labor assignments. Essentially all shops collect data for billing and the evaluation of their on-time delivery of jobs. These data may or may not contain a specification of all the processes needed to complete the job and information on how the job traverses the shop, e.g., when it enters and exits each of these processes and the operator(s) who perform the process. Few shops measure the productivity of each of their pieces of equipment and the variations in this productivity due to the use of different operators and to machine failures and their repair. Acquisition of job characteristic and status data is generally an expensive manual process. The subject embodiments comprise the acquisition of comprehensive data on the equipment, job mix, job flow and labor assignments of a print shop, typically by semi automated means like the use of handhelds to read bar codes printed on jobs in the shop and automatically record the jobs progress through the shop. Given these data items, improved analyses of the data using process models of the shop that are amenable to analysis relative to alternative configurations and control policies in order to assess the productivity of the shop relative to these alternatives is facilitated. Additionally, by measuring the flow of jobs at various points in the work process, and using flow metrics to characterize this flow, the state of flow in the shop at selected instants in time can be evaluated and this information used to change the scheduling of the jobs, their routing and the allocation of labor in such a fashion as to improve the flow and hence the productivity of the shop.

Figure 1:
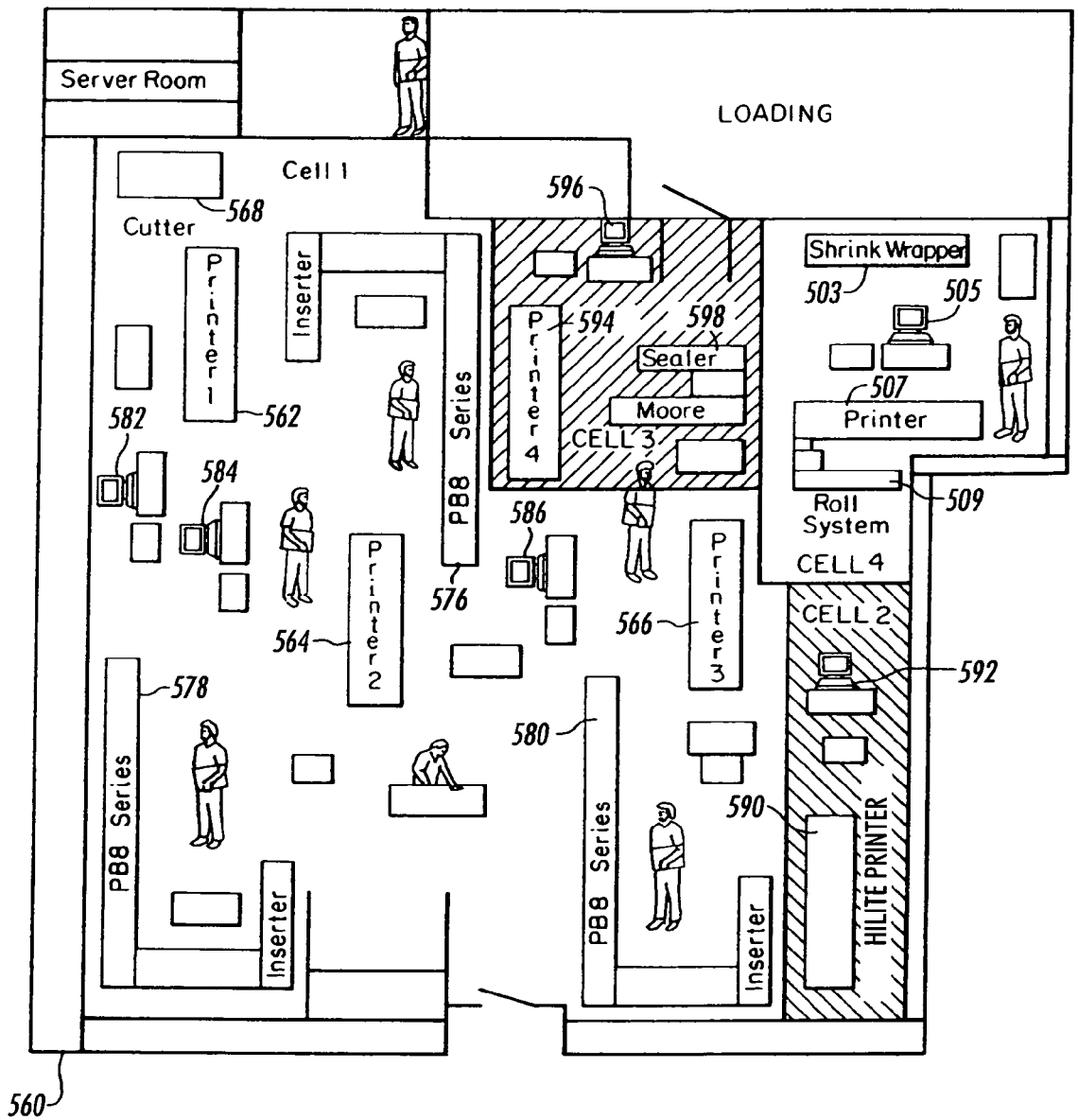
FIG. 1 is diagram depicting how a print shop may be partitioned into autonomously operating cells.

FIG. 1 shows a sample of a print shop laid out into four autonomous cells. Cell 1 includes printers 562, 564, 566 and inserters 576, 578, 580. A cutter 568 is also included in cell 1 as are computing resources 582, 584. The resources may include server computers that execute software for automatically assigning print jobs to given cells and for processing print jobs once they arrived in the given cells. Moreover, the computing resources may provide the print shop operators to control the operation of the equipment within the cell. Cell 2 includes computer system 592 and a highlight printer 590. Cell 3 includes a printer 594 as well as a sealer 598 and the computer system 596. Lastly, cell 4 includes a shrink wrapper 503, computer system 505, a printer 507 and a roll system 509. The relevant data defining the processing of a job through a print shop is acquired in a manner in accordance with the present embodiments to facilitate print shop rearrangement or job processing adjustments between the cells and the elements in the cell.

Figure 2:
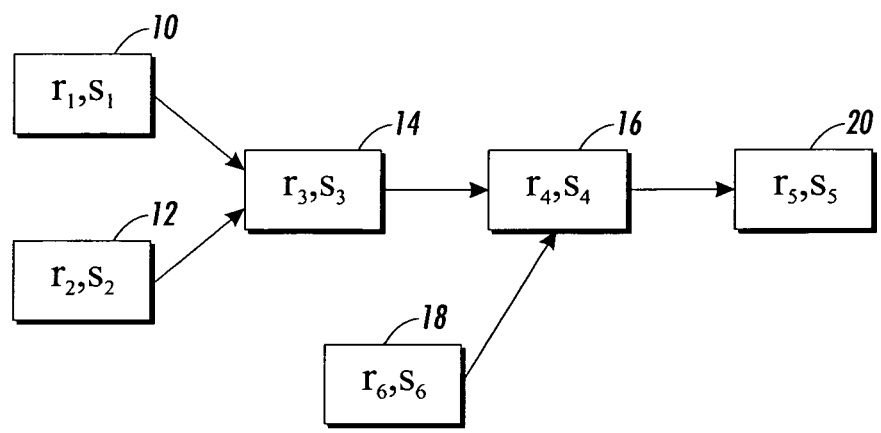
FIG. 2 is a graph describing a document production job.

With reference to FIG. 2, the model used to analyze the data comprises a job as it flows through the shop in a sequential series of production steps, labeled by the index i, characterized by a processing time of $r_i$ time units per production item and a set-up time of $s_i$ time units to change from one type of job to another. Then a job comprises of a trajectory through the shop described by a linked graph of production steps as shown in FIG. 2. The boxes 10, 12, 14, 16, 18, 20 describe the production steps required to create the job. The arrows indicate sequential next steps. Jobs flow along the arrows, so that with each arrow there is an associated flow rate of quantity per unit time as the job would progress through a shop such as that shown in FIG. 1. The parameters r and s describe the processing rate and set up time of the various possible operations. If more than one production step is associated with the same machine, then the $s_i$ associated with that machine are not independent. In addition, probabilities of failure and repair are associated with each process step (not shown in the box).

Variability enters the shop by virtue of the fact that most of the production steps involve machines (printers, binders, staplers, etc.) that fail, assumed randomly, with mean probability of failure of $p_f$ and a mean probability of repair (after failure) of $p_r$. Typically one assumes that both probability distributions are exponentially characterized by mean times to fail and repair. Variability also enters the shop via the irregular arrival of jobs and fluctuations in the availability of labor to perform the various production processes. Thus, if buffers (not shown) are introduced between production steps (i.e., work in process "WIP"), we find that the occupancy of the various buffers can fluctuate widely. Buffers in which WIP piles up identify bottlenecks and empty buffers identify production steps that are not utilized to their capacity. At any moment in time the shop is characterized by the jobs in progress, the occupancies of all the buffers, the running-idle-broken state of each process, and the assignment of labor to the various processes.

A print shop is characterized by the process steps that it supports, described diagrammatically by the boxes in FIG. 2 and characterized by their production times, set up times, times to failure, times to repair, and required labor assignments. For a given print shop this information is acquired by interviewing the print shop operator using a formalized, stylized query sheet designed to identify the production processes and estimates of their parameters. Once the shop has been characterized, a similar inquiry is launched to describe the jobs run by that shop. Each job is described by a graph like that in FIG. 2. The shop can then be described by the collection of equivalence classes of topologically equivalent directed acyclic graphs that describe the jobs run by the shop. Its state at any time is described by the collection of graphs describing all the jobs in progress, the state of each process, and the occupancies of all the buffers.

The subject development concerns the acquisition of the data that are required to specify selected local states of the print shop and the use of these data to characterize the specified state(s) of the shop, evaluate its productivity based on these states, and compare this performance with alternatives. Typically the print shop will be modeled with discrete-event simulations based on equipment parameters determined by the interview process and a hypothetical job mix based on extrapolations from data acquired from the actual jobs over a sampling time period. The time dependence of the job mix is considered explicitly in the modeling. Bottlenecks are identified and procedures for mitigating them are identified and modeled to determine their effectiveness. These mitigations are presented to the print shop operator in the form of a list of potential improvements ordered in some fashion (e.g., benefit of implementation, cost of implementation, speed/ease of implementation etc). Operator feedback on the feasibility and cost of the mitigations may be incorporated into a second round of proposals. Based on these analyses and data about the cost of labor, renovations and equipment, the financial consequences of a proposed set of modifications can be estimated. If the operator elects to adopt one or more of these proposals, the model based on the data is used as the basis for planning the reorganization of the workflow, the revised layout of the shop, the cross training of operators, the scheduling of jobs in the shop. Thus, the acquisition and analysis of these data form the basis for a set of services offered to the print shop manager to analyze the shop, its capabilities, its costs, and to suggest specific changes in work process, layout, equipment, staffing and staff training, scheduling, and the control process determining scheduling and routing in the shop, that will improve the performance of the shop by amounts that can be estimated to within roughly 10%. The essence of this subject embodiment is a practical methodology for acquiring the requisite data, analyzing it, and suggesting practical improvements that when implemented resulted in on-average a 20% cost saving that fell to the bottom line as profit.

Figure 3:
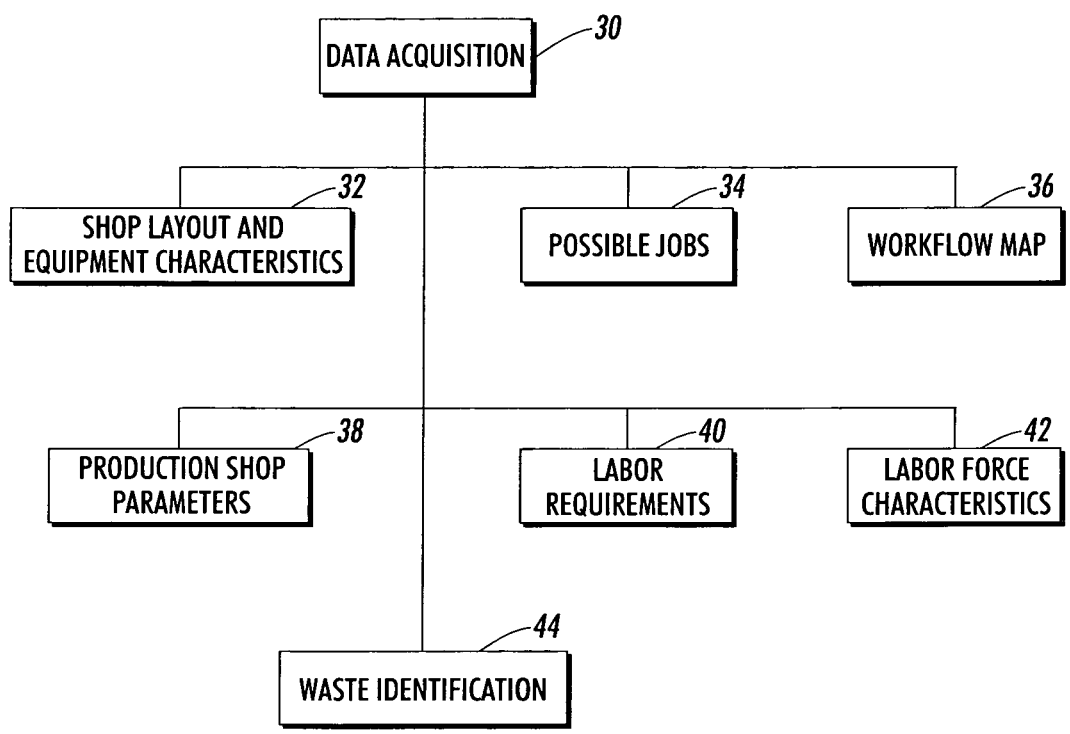
FIG. 3 is a block diagram illustrating exemplary data acquisition.

The required data to be acquired 30 fall into seven classes, FIG. 3. First, the layout 32 of the shop floor and the characteristics of its equipment must be determined. This includes the cost of square footage and of the (depreciating) equipment. The layout of the shop is described by a plan diagram, typically rendered to scale (e.g., FIG. 1). Second, data on the possible jobs 34 are acquired. These include information like arrival times, due dates, actual ship dates, cost and price, and often information on how the job moves through the shop floor (e.g., arrival and completion times for each production step, the name of the operator generating each step etc.). The jobs are broken up into equivalence classes as described in connection with FIG. 2. Third the flow of work 36 for each equivalence class is mapped onto the layout diagram. Fourth, the parameters 38 associated with each production step are determined. Fifth, the labor requirements 40 for each production process are specified. Sixth, the characteristics of the labor force 42 are determined, especially the availability of certain skills during specified time periods. Seventh, information on waste 44 is acquired. Work in progress (WIP) at each production step is measured. Information on damage rates and re-work is acquired, preferably for each production step.

These data are acquired by a wide variety of means. Shop layout data can be acquired from prior drawings or specified by shop floor measurements in real time (e.g., by tape measurements or ultrasonic or laser range finders). Cost data are obtained from shop financial records. Job data can be obtained either manually or semi-automatically. At the manual extreme the parameters of the job can be written down on job tickets that are physically associated with each job. Alternatively this information can be keyed into a computer and printed out on bar coded job tickets that are physically associated with each job. Then these can be swiped with hand helds (and extra data keyed in with each swipe) to give a complete record of how the job progressed through the shop. Another alternative to keystroke job ticket entry is to construct rf tags that accompany the job (e.g., are taped to the physical job ticket) and can be read at the beginning and end of each production step. The mapping of the flow of work to the layout diagram is done manually at the present time, but could be automated if that proved cost effective. The parameters associated with the production steps are typically measured (e.g., using stop watches) or extracted from the records of the shop (e.g., machine counters for processing times, historical failure and repair times). Labor requirements are obtained by observation of the current operation of the shop. Characteristics of the labor force are obtained from shop records. Waste is measured by direct observation of current operations or (less often) by comparing shipping information with meter reads.

To summarize some of the above description, in an efficient document production environment, autonomous cells can be used to greatly increase the efficiency of job production in a print shop. Assuming the cells are suitably configured to handle a given job mix, most, if not all, of the jobs are processed within cells and only few may require inter-cellular transportation. As will appear, using the graphic user interface tools of FIG. 5, a rise in the number of jobs requiring inter-cellular transportation or transfer can be readily perceived by a print shop operator.

This rise in transfer can greatly diminish the benefits that should be achievable in an implementation for an efficient document production environment. By employing the approach of FIG. 4, dynamic reconfiguration of the autonomous cells can be achieved without needlessly incurring expense associated with inappropriately reallocating resources among cells. Since shifting of resources, such as moving production equipment, can require not only increase in labor costs, but also loss of productivity due to downtime, it is important that any reconfiguration of cells result in immediate increased efficiency for the print shop.

Figure 4:
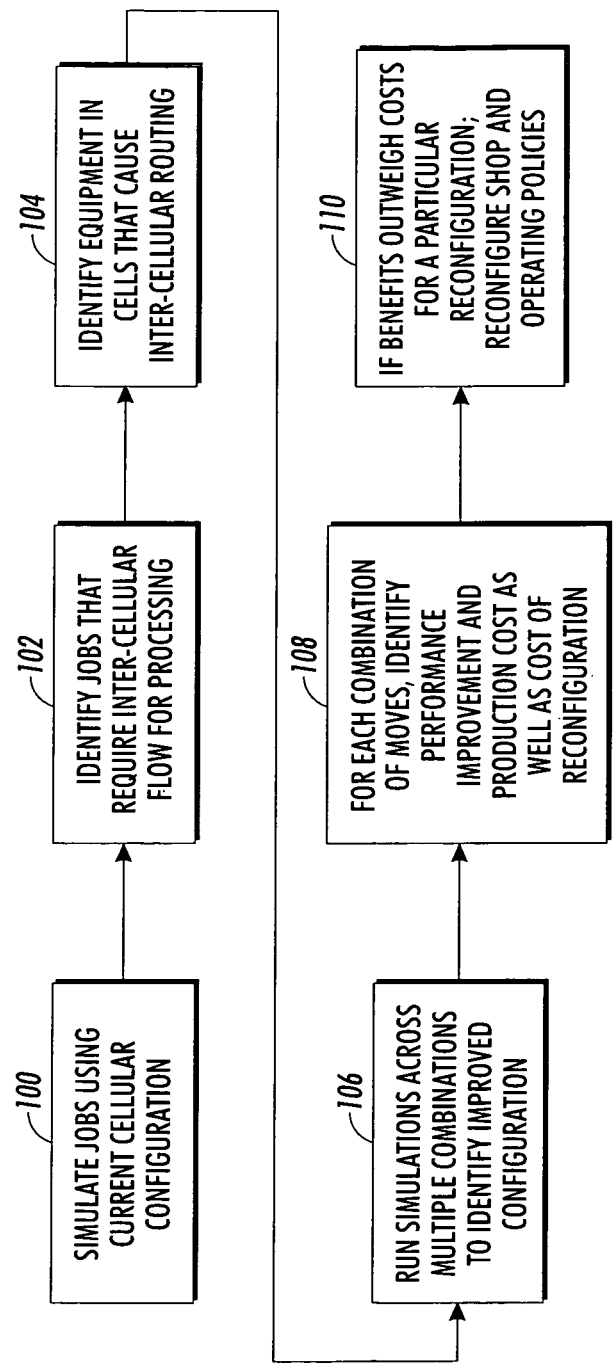
FIG. 4 is a flow chart illustrating an exemplary process for dynamically reconfiguring a set of autonomous cells in the print shop.

Referring specifically to FIG. 4, a schematic flow diagram illustrating an exemplary process for dynamically reconfiguring a set of autonomous cells, in response to a change in job mix, is shown. At step 100, a simulation-modeling tool (which will be described in further detail below) is used to simulate job flow through a cellular environment over a future planning period (e.g. a day, week or month). All jobs that require intercellular flow are then identified at step 102, and their turnaround time (TAT) and production costs are estimated. As will appear, TAT can be estimated with the tools of FIG. 5. The data and techniques necessary for estimating production costs are discussed in various ones of the related applications cited above, and the estimation of production costs, with respect to the present application is viewed as conventional.

As indicated at step 104, the lack of equipment in each cell that causes undesirable intercellular flow is identified. As should be appreciated, as job mix changes over time, various new multiple combinations among the cells (that preferably accommodate for the change in job mix) may improve cell efficiency. To gage such improvement, if any, a number of recelluarizations are performed to obtain the multiple combinations and, at step 106, simulations are run to identify the extent to which each recellularization improves efficiency among the cells.

In the example of FIG. 4, each new combination is obtained by simulating the results for an equipment move. However, it should be understood that cell efficiency could be improved in many ways other than by simply altering equipment mix. For instance, changing various resources associated with a given cell, such as software or even labor support can greatly increase the efficiency of the cell. If the overall benefits outweigh the costs, the shop is reconfigured. As a simulation is performed for each new combination (step 108), a performance improvement may be identified, and various costs (e.g., production and reconfiguration costs) associated with the improvement are determined. Each performance improvement (i.e., proposed reconfiguration) may be associated with certain benefits and costs, and those benefits/costs may be, as described hereinafter, corresponded with a "reconfiguration desirability value." As contemplated by step 110, the performance improvement having the greatest reconfiguration improvement value is used as the basis for selectively reconfiguring shop and operating policies.

The determination of a cellular configuration that requires minimal inter-cellular job flow is a difficult nondeterministic polynominal problem. It is quite likely that a shop will use some heuristics to determine a good configuration of equipment that minimizes the inter-cellular job flow and present disclosure does not address the problem of determining the best cellular configuration. However, it is desirable to evaluate any given cellular configuration (i.e., obtain the reconfiguration desirability value) with some or all of the following metrics:

Reconfiguration costs: (RC) The cost to reconfigure equipment into a new cell is calculated by aggregating the costs corresponding with (a) moving equipment from one configuration to another and associated training costs. In a present example, it may cost $10,000 to reconfigure a shop.

Decrease in production costs of all jobs: (DPC) This includes material costs, labor costs, equipment usage costs and transportation costs. It should be noted that if a job requires processing across multiple cells, it will potentially incur WIP storage costs, transportation costs, extra labor costs and perhaps larger costs associated with overproduction (to account for waste in downstream operations). As contemplated herein, all of these costs are aggregated for job production on a cellular layout using the job processing approach of an efficient document production environment. The increase (or decrease) in production costs is estimated for every cellular configuration that is simulated. In the present example, reduction in production cost resulting from formation of the new cell is $20,000.

Performance improvement cost (PIC) Job lateness for all jobs is calculated and a cost is assigned to all late jobs. This could come from a penalty imposed on late delivery or simply loss of customer satisfaction. In the present example, a new configuration affords fewer late jobs. As a result $5,000 is achieved over a given period. The translation of performance improvement to dollar value is a subjective mapping in some cases and it is left to the print shop management to assign monetary values to performance improvement, such as lateness.

In the present example, the reconfiguration desirability value assumes the form of a utility function, the utility function varying as a function of at least some of the above-described costs. That is, the utility function is generally characterized as U=f(RC,PIC, DPC), and, in the present example, may be simplified as U=DPC+PIC−RC. Using the exemplary values proposed above, U=20+5−10=$10K Referring specifically to step 108 of FIG. 4, each configuration having a positive U value constitutes a potential candidate for reconfiguration. The configuration that gives the best value of U (step 110) is preferably designated as the "particular reconfiguration."

To facilitate the presently disclosed reconfiguration approach, it is very helpful to design a shop floor in such a way as to physically support reconfiguration of cells. For instance, power outlets should be designed such that they can be moved easily if equipment is moved. In one exemplary solution, long power cables configured to the ceiling are provided so that the cables can be moved around quickly with the equipment. Other design considerations for easy reconfiguration include:

Putting equipment on wheels or on tables that have wheels.

Cross-training labor for various pieces of equipment—this permits the movement of a piece of equipment from one cell to another without loss of operational support.

Providing open and less compartmentalized room layout.

Figure 5:
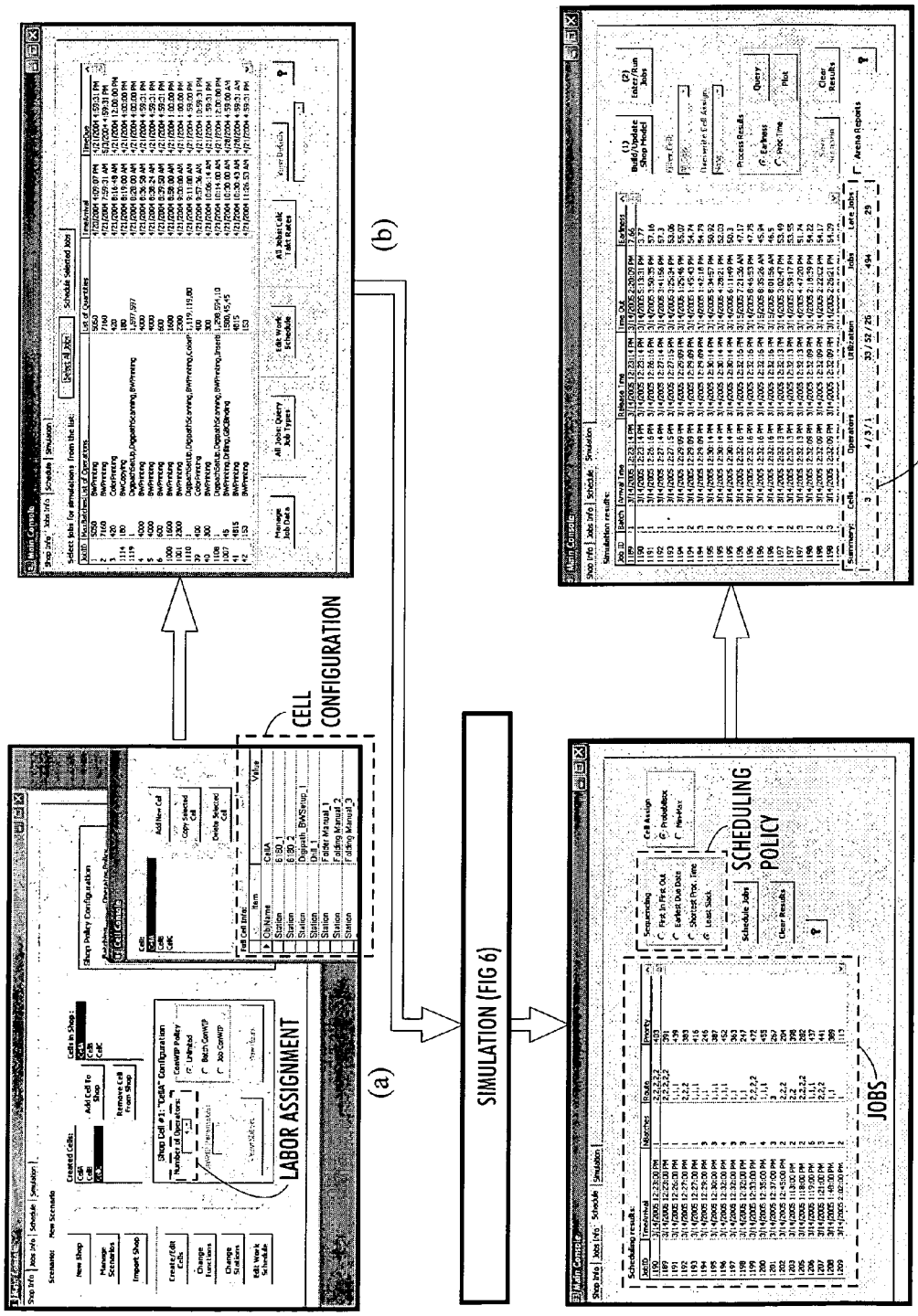
FIG. 5(a) is a plan view of a graphic user interface dialogue usable in configuring the autonomous cells of the print shop.
FIG. 5(b) is a plan view of a graphic user interface dialogue usable in obtaining information about jobs pending in the print shop.
FIG. 5(c) is a plan view of a graphic user interface dialogue providing information about job scheduling for the print shop.
FIG. 5(d) is a plan view of a graphic user interface dialogue usable in analyzing the simulation results obtained with the simulation model of FIG. 5(d)

In addition to moving equipment and reconfiguring cells, the operating policy structure (FIG. 5(*c*)) can also be dynamically changed from one time period to another. For instance, a shortest processing time sequencing policy may be effective one day, but, due to a change in job mix, an earliest due date sequencing may be more effective on another day. The disclosed approach contemplates the reconfiguration of a shop with multiple scheduling policies. As can be readily appreciated, a skilled shop operator will seek to select a policy scheme that results in the best possible shop performance for a given job mix.

Figure 6:
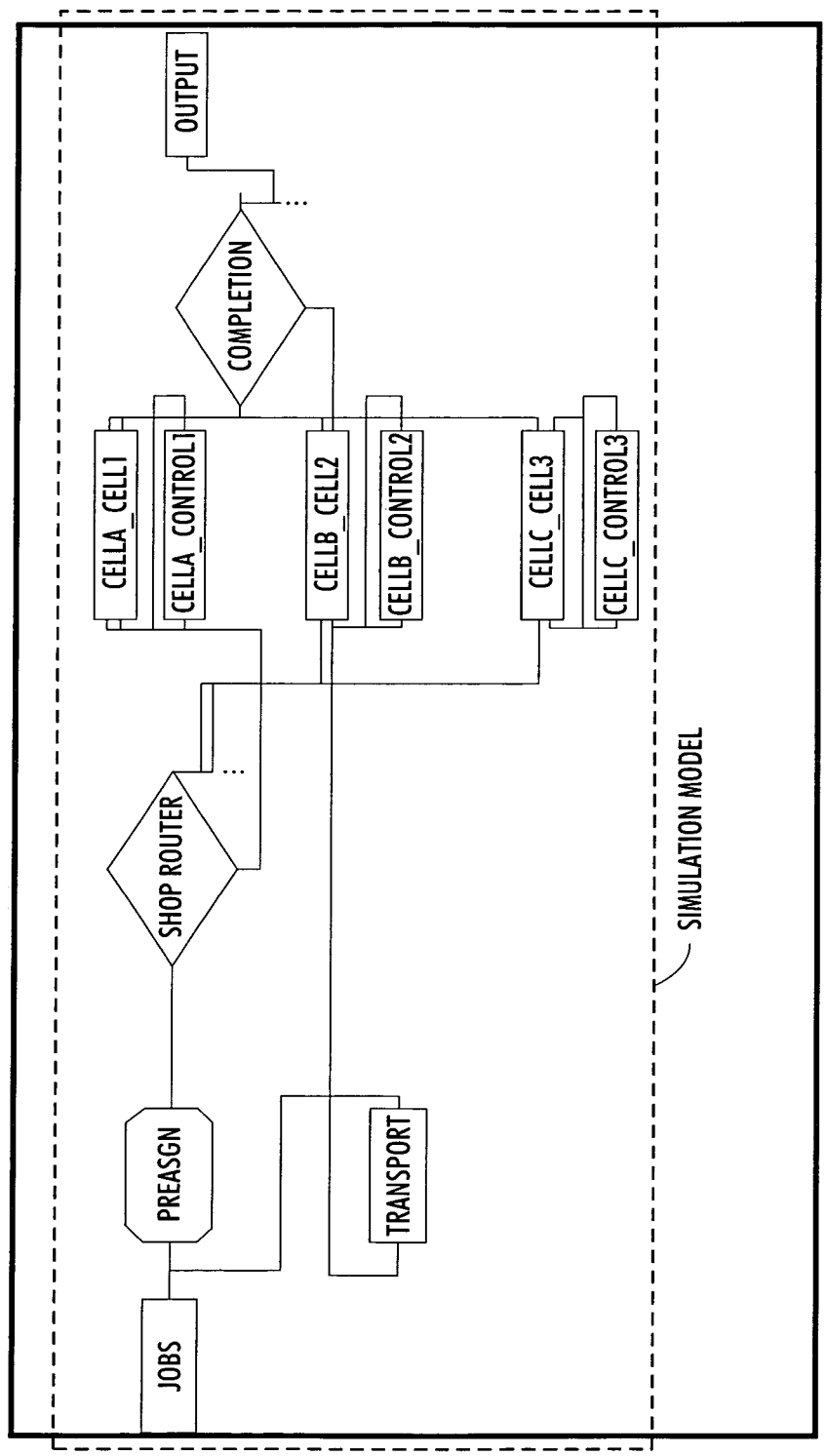
FIG. 6 is a schematic diagram illustrating an exemplary simulation model for use with the disclosed embodiments

FIGS. 5 and 6 collectively provide a schematic view showing how cells can be defined, simulated and evaluated. The following discussion of FIGS. 5 (including FIGS. 5(*a*)-5(*d*)) and 6 is intended to not only provide an understanding as to how the operating policy can be dynamically changed, but to address some of the implementation issues suggested by the above discussion accompanying FIG. 4. For instance, an example of a simulation model appropriate for use in step 106 is shown in FIG. 6.

Referring now to FIG. 5(*a*), a tool for configuring the shop cells is shown. In the example of FIG. 5(*a*), the "Shop Info." screen of the "Main Console" is selected and four operators are assigned to three cells. The equipment requirements for the first of the three cells are shown in the lower right hand corner of the screen. Referring next to FIG. 5(*b*), the "Job Info." tab relates to the structure of the jobs, and can be is used to obtain, among other things, a list of operations associated with jobs to be scheduled.

Referring to FIG. 5(*c*), the scheduling policy screen (initiated with the "Schedule" tab) is used to determine how jobs are scheduled relative to the cells, and provides an indication as to how the jobs are being executed among the cells. Referring to FIG. 6, an exemplary model for performing the simulation of the disclosed embodiments is shown. Based, in part, to the teachings of the paper *A Lean Document Production Controller for Print shop Management* (S. Rai, D. Viassolo, IEEE CDC 2003, Hawaii), simulation of jobs may involve a two level hierarchical control architecture consisting of routing jobs to cells, sequencing jobs at the cells, using batch-splitting algorithms to process jobs within the cell and using a CONWIP policy to control the WIP in each cell as described in the paper.

It is advantageous that the disclosed simulation uses a discrete event model built from declarative specifications of production environment constructs. The constructs can include a wide range of metrics or parameters, including number of machines, operations, jobs, or other document production constraints, thereby permitting automatic model generation based on the declarative specifications (i.e., information provided by the main console of FIGS. 5(*a*)-5(*d*)). It will be appreciated that there are many ways in which the discrete event simulation model of FIG. 6 could be designed without altering the preferred practices associated with the disclosed embodiments.

Referring finally to FIG. 5(*d*), the results or output of executing the simulation model are shown. Based on the simulation results, there are various adjustments that can be made in one or more of FIGS. 5(*a*) to 5(*c*).

In addition to using the evaluative approaches of FIGS. 4-6, it should be understood that reconfiguration of equipment and labor can also be triggered by job measurements on a shop floor. For instance, an imbalance of flow within a cell may give rise to a "bottleneck," thus triggering simulation studies (as discussed above) to determine an improved configuration.

Based on the above specification, various ones of the following advantageous features can now be more fully appreciated by those skilled in the art:

In one feature, an approach accommodating for job mix change in a print shop is provided. As the job mix changes, a reconfiguration simulation is performed to determine how one or more resources of the print shop might be reallocated to improve print shop efficiency. By performing a reconfiguration simulation prior to performing any actual reconfiguration, costs associated with reallocating resources (e.g., altering cell configuration and/or labor requirements) are minimized.

In another feature, the results of the reconfiguration simulation are assessed with a simple utility function to determine which of several possible reconfigurations would best increase print shop efficiency. Through use of this sort of utility function, a print shop operator can simply, yet effectively assess the best available reconfiguration option among several reconfiguration options.

In yet another feature, a mechanism is provided for assisting the print shop operator in (a) determining when to perform the simulation, and (b) assessing the effectiveness of one simulation relative to another. The mechanism can include a graphic user interface adapted to draw attention to how a current print shop resource allocation fails to accommodate a current incoming job mix. As contemplated, the mechanism is useful in spotting those jobs that cannot be performed completely in one cell and/or the sort of print shop operation(s) that is degraded as a result of job mix change.

In another feature, the disclosed simulation takes advantage of a discrete simulation model built from the declarative specifications of production environment constructs. These constructs specifications include, among other things, equipment, number of operators and their corresponding skill sets, cell structure (i.e. number and type of equipment in the cell), batching policy, operator and shop schedule, scheduling and sequencing policy (e.g. first-in-first out, least slack, shortest remaining processing time) and cell-routing method. In this way the corresponding model generates information automatically from a source of production environment constructs (e.g., a "main console").

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for processing jobs progressing through a print shop, the system comprising a server computer including a processor configured to:
   characterize the print shop by a linked graph of process steps that the print shop supports;
   acquire over a network production related data for at least one production related resource from one of an RF reader and handheld in communication with the server computer, the production related data corresponding with a processing of current print jobs at the at least one production related resource as the current print jobs flow through the print shop;
   analyze the production related data by characterizing a trajectory of each current print job through the print shop by a linked graph of production steps;
   represent the current print jobs into equivalence classes;
   describe the print shop by a collection of the equivalence classes of topologically equivalent directed acyclic graphs;
   acquire data of future print jobs from a main console of the server computer including production steps required to process the future print jobs;
   represent the future print jobs into the equivalence classes;
   map a workflow for each equivalence class onto a layout diagram of a shop floor;
   identify the future print jobs requiring intercellular flow for processing in more than one cell of the print shop;
   identify equipment missing within a cell causing the intercellular flow;
   generate potential cell reconfigurations including different equipment combinations;
   identify a performance improvement for each combination;
   for the each combination, determine a reconfiguration desirability value associated with the performance improvement;
   select the combination with a greatest reconfiguration desirability value; and,
   output the a configuration corresponding to the selected combination to a graphic user interface of the main console.

2. The system of claim 1 wherein the processor is further configured to acquire the production related data over a sample period.

3. The system of claim 1, wherein the generating the potential reconfigurations is performed in response to a change in job mix.

4. The system of claim 1, wherein the generating the potential reconfigurations is performed in response to the acquired data indicating a possible bottleneck.

5. The system of claim 1, wherein the reconfiguration desirability value is computed using the utility function $U=DPC+PIC-=RC$, wherein DPC is the decrease in production costs of all jobs, PIC is the performance improvement costs, and RC is the cost to reconfigure equipment into a new cell.

6. The system of claim 1 further comprising:
   acquiring operator data corresponding with the processing of the current print.

7. The system of claim 1, wherein the processor is further configured to map the workflow by representing production steps (r, s) involving machines ($p_{failure}$, $p_{repair}$) required to create one of the future print jobs as a linked graph, wherein the one future print job flows along arrows each associated with a flow rate.

8. The system of claim 1, wherein the processor is configured to identify the future print jobs requiring the intercellular flow by running at least one simulation of the each reconfiguration.

9. The system of claim 1, wherein the processor is further configured to perform at least one determination selected from a group consisting of:
   parameters associated with each production step;
   labor requirements for the each production step;
   characteristics of a labor force at the print shop;
   work-in-progress at the each production step;
   cost and turnaround time of each future print job; and,
   a combination of the above.

10. A method for processing jobs progressing through a print shop, the method comprising:
    characterizing the print shop by a linked graph of process steps that the print shop supports;
    acquiring over a network production related data for at least one production related resource from one of an RF reader and a handheld in communication with the server computer, the production related data corresponding with a processing of current print jobs at the at least one production related resource as the current print jobs flow through the print shop, wherein the server computer:
    analyzes the production related data by characterizing a trajectory of each current print job through the print shop by a linked graph of production steps;
    represents the current print jobs into equivalence classes;
    describes the print shop by a collection of the equivalence classes of topologically equivalent directed acyclic graphs;
    acquires data of future print jobs from a main console including production steps required to process the future print jobs;
    represents the future print jobs into the equivalence classes;
    maps a workflow for each equivalence class onto a layout diagram of a shop floor;
    identifies the future print jobs requiring intercellular flow for processing in more than one cell of the print shop;
    identifies equipment missing within a cell causing the intercellular flow;
    generates potential cell reconfigurations including different equipment combinations;

identifies a performance improvement for each combination;

for the each combination, computing using a processor a reconfiguration desirability value associated with the performance improvement;

selects the combination with a greatest reconfiguration desirability value; and, outputs a configuration corresponding to the selected combination to a graphic user interface of the main console.

11. The method of claim 10 further acquiring the production related data over a sample period.

12. The method of claim 10, wherein the generating the potential reconfigurations is performed in response to a change in job mix.

13. The method of claim 10, wherein the generating the potential reconfigurations is performed in response to the acquired data indicating a possible bottleneck.

14. The method of claim 10, wherein the reconfiguration desirability value is computed using the utility function U=DPC+PIC−=RC, wherein DPC is the decrease in production costs of all jobs, PIC is the performance improvement costs, and RC is the cost to reconfigure equipment into a new cell.

15. The method of claim 10, further comprising:
receiving the data of the future print jobs as one of input keyed into a computer and a barcode scanned by a handheld.

16. The method of claim 10, further comprising acquiring operator data corresponding with the current print job further includes information regarding the operator.

17. The method of claim 10, further comprising mapping the workflow by representing production steps (r, s) involving machines ($p_{failure}$, $p_{repair}$) required to create one of the future print jobs as a linked graph, wherein the one future print job flows along arrows each associated with a flow rate.

18. The method of claim 10, further comprising identifying the future print jobs requiring the intercellular flow by running at least one simulation of the each reconfiguration.

19. The method of claim 10, further comprising performing at least one determination selected from a group consisting of:

parameters associated with each production step;
labor requirements for the each production step;
characteristics of a labor force at the print shop;
work-in-progress at the each production step;
cost and turnaround time of each future print job; and,
a combination of the above.

* * * * *